United States Patent [19]

Myszka

[11] Patent Number: 5,039,191

[45] Date of Patent: Aug. 13, 1991

[54] OPTICAL COUPLING ARRANGEMENT

[75] Inventor: Edward G. Myszka, St. Charles, Ill.

[73] Assignee: Motorola Inc., Schaumburg, Ill.

[21] Appl. No.: 542,994

[22] Filed: Jun. 25, 1990

[51] Int. Cl.$^5$ ............................................... G02B 6/26
[52] U.S. Cl. ................................ 385/31; 250/227.11;
385/49
[58] Field of Search ............... 350/96.10, 96.15, 96.17,
350/96.11, 96.20, 96.21; 250/227.11

[56] References Cited

U.S. PATENT DOCUMENTS

| | | | |
|---|---|---|---|
| 3,625,589 | 12/1971 | Snitzer | 350/96.29 |
| 4,215,937 | 8/1980 | Borsuk | 350/96.15 X |
| 4,668,044 | 5/1987 | D'Auria et al. | 350/96.15 |
| 4,728,787 | 3/1988 | Henry et al. | 250/227.11 |
| 4,966,433 | 10/1990 | Blonder | 350/96.20 X |
| 4,978,190 | 12/1990 | Veith | 350/96.18 |
| 4,979,787 | 12/1990 | Lichtenberger | 350/96.20 |

FOREIGN PATENT DOCUMENTS

| | | | |
|---|---|---|---|
| 62-71908 | 4/1987 | Japan | 350/96.15 X |
| 1-147509 | 6/1989 | Japan | 350/96.15 X |

Primary Examiner—Brian Healy
Attorney, Agent, or Firm—Peter D. Hudson

[57] ABSTRACT

An optical coupling arrangement comprising: an optical laser emitter (4); an optical fiber (8); mounting means (10, 12, 14) for mounting the laser relative to the optical fiber so as to couple into the optical fiber light emitted by the laser; sensing means (11, 18, 24) for sensing the level of a predetermined proportion of light in the optical fiber; and piezoelectric moving means (10, 14) for moving the laser in orthogonal directions responsive to the sensing means so as to the increase coupling into the optical fiber of light emitted by the laser. The sensing means and the piezoelectric moving means thus form a closed, auto-alignment feedback loop which moves the laser relative to the optical fiber so as to compensate for movement between the laser and the optical fiber, thereby ensuring maximum coupling efficiency between the laser and the optical fiber.

16 Claims, 3 Drawing Sheets

OPTICAL COUPLING ARRANGEMENT

BACKGROUND OF THE INVENTION

This invention relates to an optical coupling arrangement, and particularly, though not exclusively, to an arrangement for Coupling an optical light source to an optical fiber.

High speed data and telecommunications systems designers are always forced to compromise between system bandwidth and data rate. In comparison to pure electrical circuits, the use of optoelectronic devices can increase data rates with relatively little bandwidth trade-off.

High performance semiconductor laser packages that could enhance system performance were developed more than a decade ago. However, one difficulty found in the assembly of such packages is in achieving and maintaining the precise fixturing and alignment necessary between the optical fiber core (typically ~9 μm in diameter) and the laser emitting facet (typically having a dimension of ~2-4 μm) in order to ensure good optical coupling.

Typically, optical fibers are locked in place using a fixative such as UV-cured epoxy or solder. Optical fiber to laser alignment techniques available today can ensure alignment tolerances of less than ±0.1 μm. However, the ability to lock and hold this alignment over operating temperature extremes has yet to be proven reliable. Movement of the optical fiber relative to the laser is almost always encountered, due to the intrinsic nature of the different linear coefficients of expansion of the materials used. Coupling losses due to such movements may not be immediately apparent, but have been frequently found to materialize subsequently, causing severe performance degradation.

SUMMARY OF THE INVENTION

It is an object of the present invention to provide an improved optical coupling arrangement wherein the above disadvantages may be overcome or at least alleviated.

In a preferred embodiment of the invention there is provided an optical coupling arrangement comprising:
an optical emitter;
an optical conductor;
mounting means for mounting the optical emitter relative to the optical conductor so as to couple into the optical conductor light emitted by the optical emitter,
sensing means for sensing the level of a predetermined proportion of light in the optical conductor; and
piezoelectric moving means for moving the mounting means in orthogonal directions responsive to the sensing means so as to the increase coupling into the optical conductor of light emitted by the optical emitter.

The sensing means and the piezoelectric moving means thus form a closed, auto-alignment feedback loop which moves the optical emitter relative to the optical conductor so as to compensate for movement between the optical emitter and the optical conductor, thereby ensuring maximum coupling efficiency between the optical emitter and the optical conductor.

BRIEF DESCRIPTION OF THE DRAWINGS

Two optical coupling arrangements in accordance with the present invention will now be described, by way of example only, with reference to the accompanying drawing, in which.

DESCRIPTION OF THE PREFERRED EMBODIMENT

Figure 1:
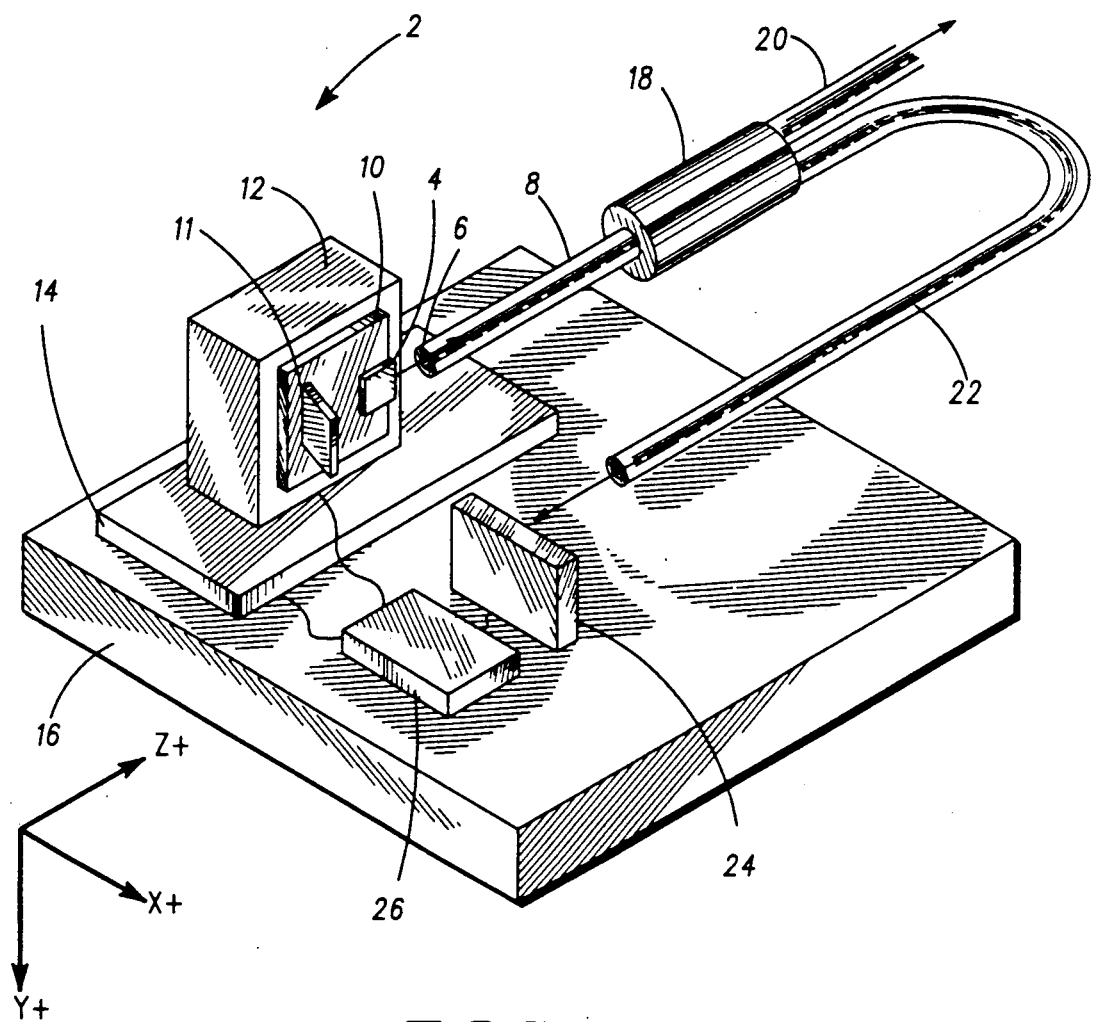
FIG. 1 shows a first optical coupling arrangement for coupling a laser to an optical fiber.

Referring now to FIG. 1, in an optical coupling arrangement 2 a semiconductor laser device 4 is disposed to emit light into the light-conducting core 6 of an optical fiber 8. The laser 4 is mounted, using epoxy adhesive or any other suitable fixative, to a planar sheet of piezoelectric material 10 positioned generally in a vertical plane. Alternatively, the laser 4 can be mounted on an intermediate submount (not shown) fixed to the piezoelectric material 10 so as to provide desired stress and thermal characteristics. A monitor photodetector 11 is also mounted on the piezoelectric sheet 10 at a side remote from the fiber 8 so as to measure a proportion of the light emitted by the laser 4 and so allow monitoring of the proper operation of the laser 4 in known manner.

The piezoelectric sheet 10 is mounted on a sub-mount block 12, which is in turn mounted on a planar sheet of piezoelectric material 14 positioned generally in a horizontal plane. The piezoelectric sheet 14 is mounted on a base 16. The sheets 10, 14 are arranged so that their directions of piezoelectric movement are in orthogonal planes, which may be considered in conventional terminology as the X- and Y-axes respectively.

The optical fiber 8 is fixed in position relative to the base 16 and connects at an end remote from the laser 4 to the input of an optical fiber splitter 18 of a known kind. The optical splitter 18 splits the light coupled into the optical fiber 8 from the laser 4 between an output optical fiber 20 and a feedback optical fiber 22 in a known ratio (e.g. 90% into the output optical fiber 20 and 12% into the feedback optical fiber 22). The feedback optical fiber 22 is arranged so that its end remote from the optical splitter 18 emits its light onto a photoelectric sensor 24 mounted on the base 16. The photoelectric sensor 24 has a wide sensor area so as to allow for movement of the feedback optical fiber 22 in use. The electrical output from the photoelectric sensor 24 is fed to an electrical feedback circuit 26. The electrical feedback circuit 26, which may conveniently comprise a microprocessor (not shown), produces electrical outputs which are applied to the piezoelectric sheets 10 and 14 as will be explained below.

In practice, the light emitting area of the laser 4 has a dimension of some 2-4 μm and the optically conducting core 6 of the optical fiber 8 has a diameter of some 9 μm. The laser 4 and the optical fiber 8 are positioned, with the components in their initial rest positions, in accurate alignment so as to produce optimal coupling efficiency of light from the laser 4 into the optical fiber 8. In use of the coupling arrangement 2, the rest positions of the components will inevitably vary from their initial positions. In spite of such variations, accurate alignment and therefore optimal coupling efficiency is maintained in use in the following way.

As the relative positions of the laser 4 and the optical fiber 8 begin to change and begin to move out of alignment, the coupling efficiency of light from the laser 4 into the optical fiber 8 begins to fall, the amount of light coupled into the feedback optical fiber 22 begins to fall and the electrical output of the photoelectric sensor 24 decreases. This decrease in the electrical output of the photoelectric sensor 24 is compared with that of the electrical output of the monitor photodetector 11 by the feedback circuit 26. If these decreases do not correlate, a realignment is required.

Figure 2:
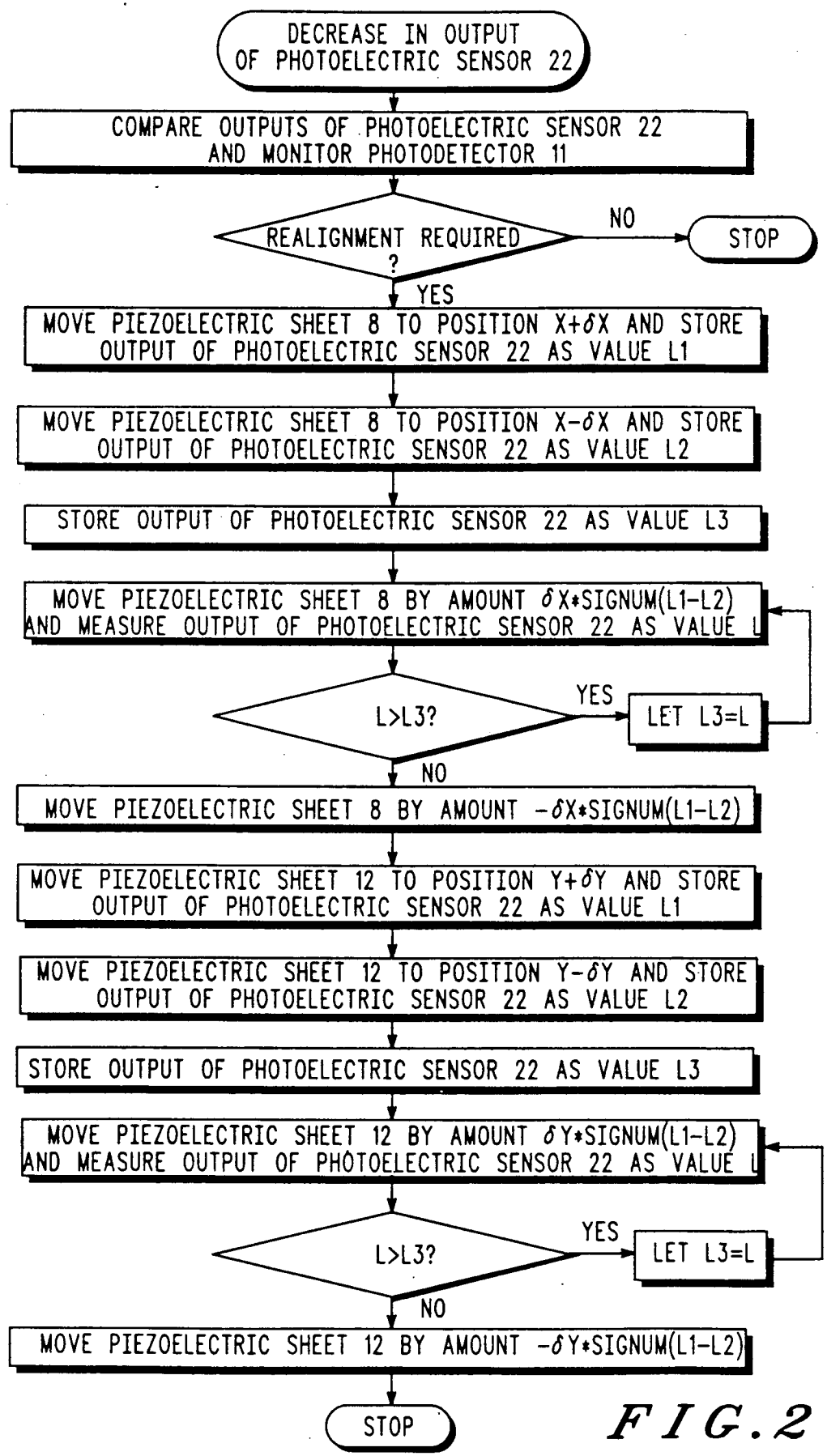
FIG. 2 shows a flowchart illustrating the operation of the optical coupling arrangement of FIG. 1.

Referring now also to FIG. 2, when the feedback circuit 26 determines that a realignment is required (indicative of a decrease in the alignment and coupling efficiency between the laser 4 and the optical fiber 8), the feedback circuit first applies a voltage to the piezoelectric sheet 10 to move the laser 4 along the X-axis by a small amount ∂X, first in one direction and then in the opposite direction, to determine which of the two directions of movement causes an increase (or the greater increase) in the electrical output of the photoelectric sensor 24. The feedback circuit 26 then increases the magnitude of the applied voltage to move the laser 4 in the optimum direction along the X-axis in steps of ∂X until the electrical output of the photoelectric sensor 24 no longer increases, indicating that a maximum has been passed at which the laser 4 and the optical fiber 8 were optimally aligned on the X-axis. The feedback circuit 26 then decreases the magnitude of the voltage applied to the piezoelectric sheet 10 to move the laser 4 back by ∂X to the optimum position, and thereafter maintains the voltage to the piezoelectric sheet 10 at this optimal level.

The feedback circuit 26 then applies a voltage to the piezoelectric sheet 14 to move the laser 4 along the Y-axis by a small amount ∂Y, first in one direction and then in the opposite direction, to determine which of the two directions of movement causes an increase (or the greater increase) in the electrical output of the photoelectric sensor 24. The feedback circuit 26 then increases the magnitude of the applied voltage to move the laser 4 in the optimum direction along the Y-axis in steps of ∂Y until the electrical output of the photoelectric sensor 24 no longer increases, indicating that a maximum has been passed at which the laser 4 and the optical fiber 8 were optimally aligned on the Y-axis. The feedback circuit 26 then decreases the magnitude of the voltage applied to the piezoelectric sheet 14 to move the laser 4 back by ∂Y to the optimum position, and thereafter maintains the voltage to the piezoelectric sheet 14 at this optimal level. Thus the laser 4 and the optical fiber 8 are brought back to optimal optical alignment and coupling efficiency in the X,Y plane.

In this way, the optical coupling arrangement of FIG. 1 acts as closed-loop feedback system, any decrease in alignment and coupling efficiency between the laser 4 and the optical fiber 8 being sensed (by the feedback optical fiber 22, the photoelectric sensor 24, the monitor photodetector 11 and the feedback circuit 26), and being corrected by the feedback circuit 26 causing the piezoelectric sheets 10, 14 to move the laser 4 back to optimal optical alignment and coupling efficiency with the optical fiber 8. The auto-alignment feedback loop remains continuously active during operation of the laser 4, ensuring maximum coupling efficiency throughout operation by moving the laser 4 to compensate for any intrinsic or extrinsic movements of the optical fiber 8 relative to the laser 4.

It will be appreciated that the optical coupling arrangement of FIG. 1 may be built in a compact package with no conventional "moving" parts, the "moving" elements being the rigid piezoelectric sheets 10 and 14.

It will also be appreciated that, if desired, the laser 4 may also be moved in a third orthogonal (on the Z-axis) by use of a further orthogonal piezoelectric sheet (not shown).

Figure 3:
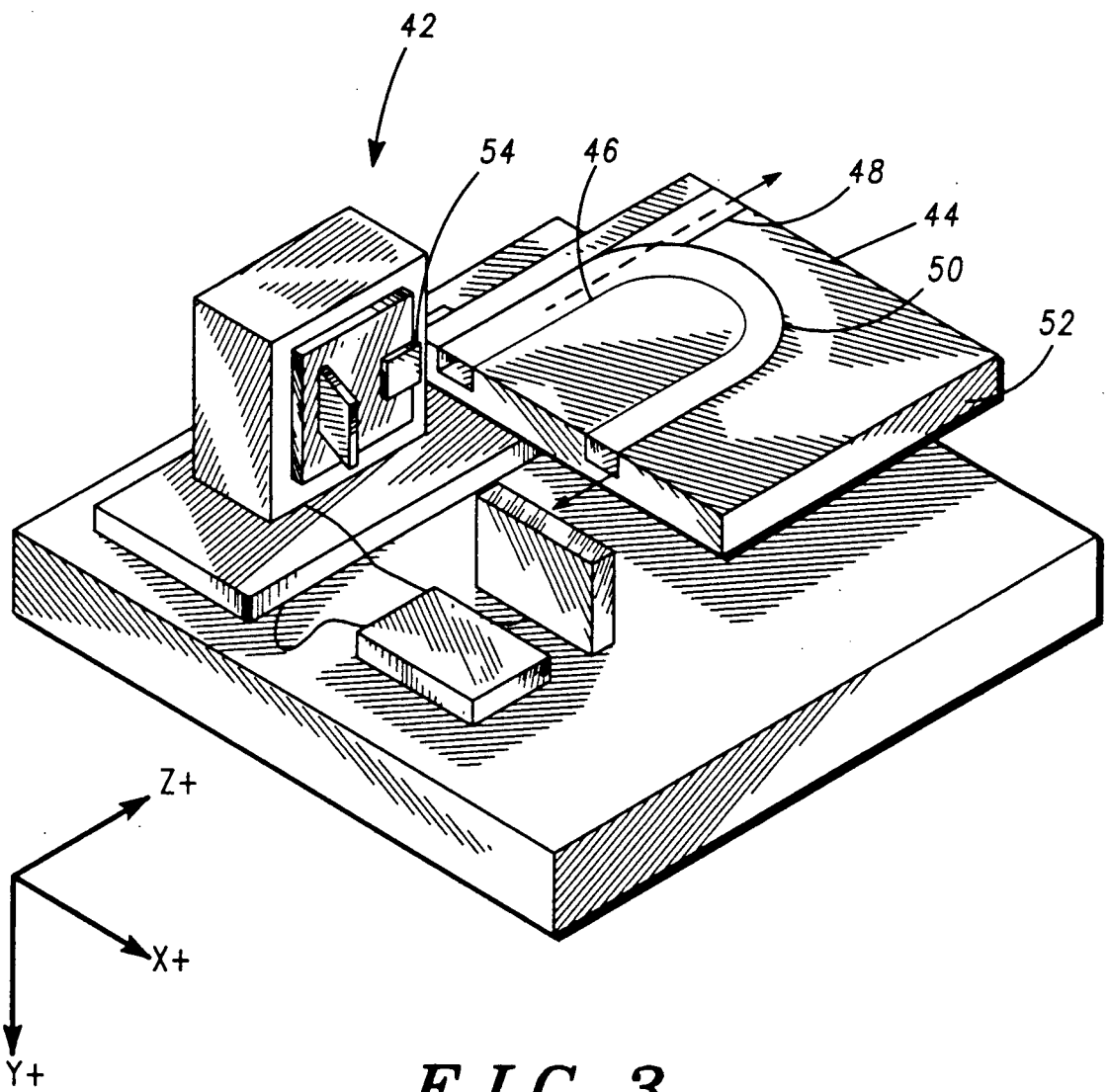
FIG. 3 shows a second optical coupling arrangement for coupling a laser to an optical fiber.

Referring now to FIG. 3, in an alternative optical coupling arrangement 42, similar to the optical coupling arrangement 2 described above with relation to FIG. 1, an optical waveguide 44 incorporating a splitter is used instead of the optical fiber splitter 18. The optical waveguide 44 may be formed as an integral component in which an input optical waveguide channel 46, an output optical waveguide channel 48 and a feedback optical waveguide channel 50 are formed in conventional manner in a single substrate 52. The other components of the optical coupling arrangement 42 are identical with the already described optical coupling arrangement 2 and will not be described in further detail. The operation of the optical coupling arrangement 42 is similarly identical with that of the already described optical coupling arrangement 2, an auto alignment feedback loop continuously ensuring maximum coupling efficiency throughout operation by moving a laser 54 to compensate for any intrinsic or extrinsic movements of the laser 54 relative to the input optical waveguide channel 46. The output optical waveguide channel 50 may be terminated into an output optical fiber (not shown) inside a connector (not shown) mounted on a wall of the package (also not shown). It will be understood that by integrating the optical splitter into the single waveguide component 44, the system design can be further enhanced by reducing the package size of the coupling arrangement.

It will be appreciated that various other modifications or alternatives to the above described embodiments will be apparent to the man skilled in the art without departing from the inventive concept of incorporating an auto alignment feedback loop in an optical coupling arrangement so as to compensate for movement between an optical emitter and an optical conductor.

I claim:

1. An optical coupling arrangement comprising:
   an optical emitter;
   an optical conductor;
   mounting means for mounting the optical emitter relative to the optical conductor so as to couple into the optical conductor light emitted by the optical emitter,
   sensing means for sensing the level of a predetermined proportion of light in the optical conductor; and
   moving means for moving the mounting means responsive to the sensing means so as to the increase coupling into the optical conductor of light emitted by the optical emitter, the moving means comprising at least one piezoelectric element connected to the mounting means.

2. An optical coupling arrangement according to claim 1 wherein the moving means comprises a plurality of piezoelectric elements connected to the mounting means and arranged to move the mounting means in a plurality of orthogonal directions.

3. An optical coupling arrangement according to claim 2 wherein the moving means comprises two piezoelectric elements connected to the mounting means and arranged to move the mounting means in two orthogonal directions.

4. An optical coupling arrangement according to claim 1 wherein the sensing means comprises optical splitter means for splitting light in the optical conductor in the said predetermined proportion for sensing and output respectively.

5. An optical coupling arrangement according to claim 4 wherein the optical splitter means comprises an optical fiber splitter.

6. An optical coupling arrangement according to claim 4 wherein the optical splitter means comprises an optical waveguide splitter.

7. An optical coupling arrangement comprising:
an optical emitter;
an optical conductor;
mounting means for mounting the optical emitter relative to the optical conductor so as to couple into the optical conductor light emitted by the optical emitter,
sensing means for sensing the level of a predetermined proportion of light in the optical conductor; and
piezoelectric moving means for moving the mounting means in orthogonal directions responsive to the sensing means so as to the increase coupling into the optical conductor of light emitted by the optical emitter.

8. An optical coupling arrangement adapted for incorporation in a package comprising:
an optical emitter;
an optical conductor;
mounting means for mounting the optical emitter relative to the optical conductor so as to couple into the optical conductor light emitted by the optical emitter,
sensing means fixed to the mounting means for sensing the level of a predetermined proportion of light in the optical conductor; and
moving means fixed to the mounting means for moving the mounting means responsive to the sensing means so as to the increase coupling into the optical conductor of light emitted by the optical emitter, whereby alignment of the optical emitter and the optical conductor may be achieved wholly within the package.

9. An optical coupling arrangement according to claim 8 wherein the sensing means comprises a photoelectric sensor.

10. An optical coupling arrangement according to claim 8 wherein the moving means comprises at least one piezoelectric element connected to the mounting means.

11. An optical coupling arrangement according to claim 10 wherein the moving means comprises a plurality of piezoelectric elements connected to the mounting means and arranged to move the mounting means in a plurality of orthogonal directions.

12. An optical coupling arrangement according to claim 11 wherein the moving means comprises two piezoelectric elements connected to the mounting means and arranged to move the mounting means in two orthogonal directions.

13. An optical coupling arrangement according to claim 8 wherein the sensing means comprises optical splitter means for splitting light in the optical conductor in the said predetermined proportion for sensing and output respectively.

14. An optical coupling arrangement according to claim 13 wherein the optical splitter means comprises an optical fiber splitter.

15. An optical coupling arrangement according to claim 13 wherein the optical splitter means comprises an optical waveguide splitter.

16. An optical coupling arrangement according to claim 8 wherein the optical fiber has an output for coupling independently of the sensing means, whereby alignment of the optical emitter and the optical conductor may be achieved while the arrangement is in use via the optical fiber output.

* * * * *